United States Patent Office 2,942,498
Patented June 28, 1960

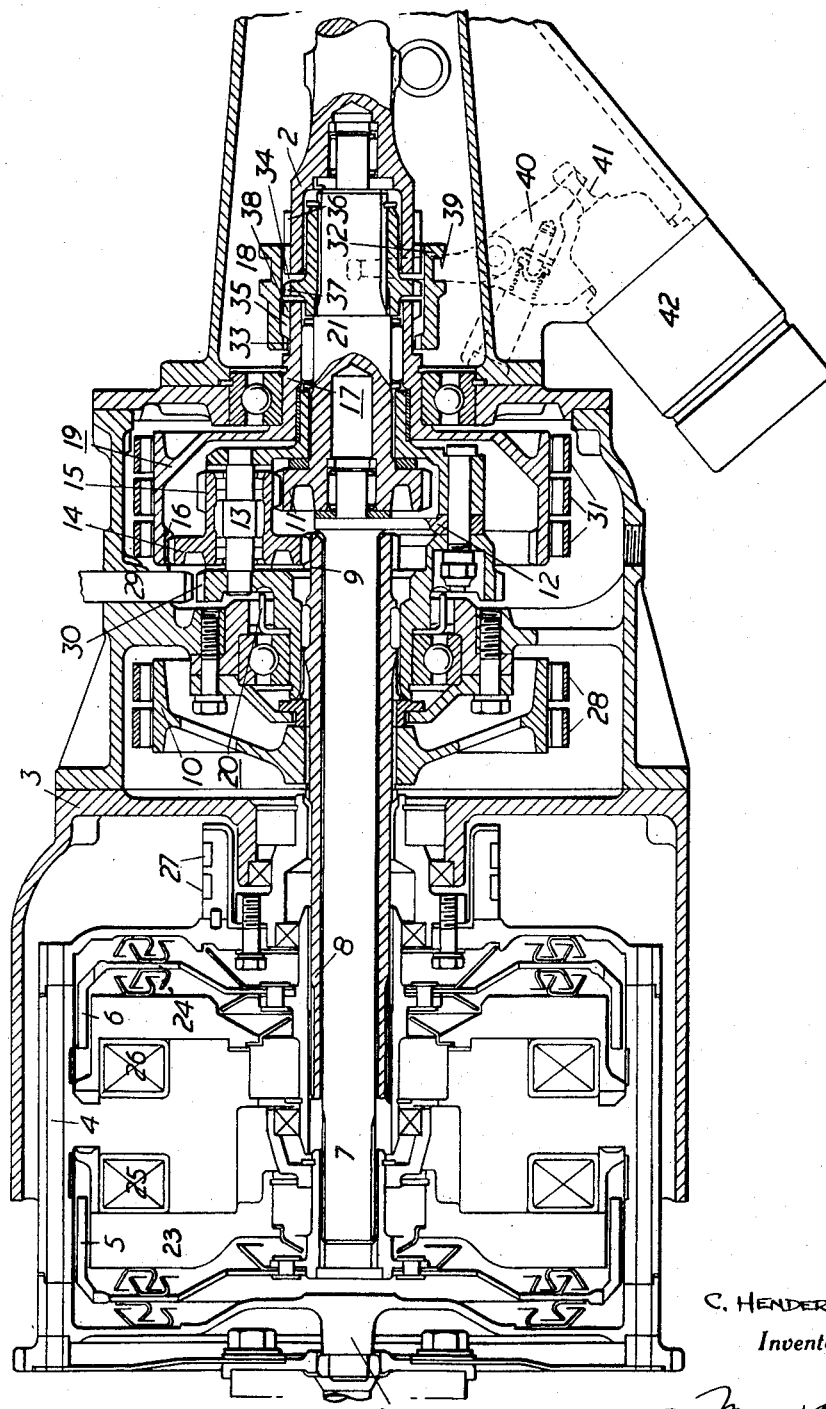

2,942,498
MECHANICAL POWER TRANSMISSION SYSTEMS

Cyril Henderson, New Malden, England, assignor to Smiths America Corp., Washington 6, D.C.

Filed Mar. 1, 1956, Ser. No. 568,819

Claims priority, application Great Britain Mar. 3, 1955

7 Claims. (Cl. 74—759)

The present invention relates to variable-speed transmission systems of the epicyclic gear type such as may be used, for example, on motor vehicles.

It is the object of the invention to provide an epicyclic transmission which is comparatively simple in relation to the number of ratios which may be provided.

According to the present invention we provide, in an epicyclic transmission for the transmission of power from a driving to a driven shaft collines therewith, first and second clutches whose driving members are attached to the driving shaft and whose driven members are attached respectively to first and second intermediate shafts concentric with each other and the driving shaft, means engageable to prevent rotation of the second intermediate shaft, a first sun wheel mounted on the second intermediate shaft, a second sun wheel, of diameter different from the first sun wheel, coupled to the driven shaft, a planet carrier mounted on the first intermediate shaft, first and second planet pinions mounted in the planet carrier upon a common shaft for rotation about an axis parallel to that of the driving shaft, said first and second planet pinions engaging with the first and second sun wheels, means engageable to prevent rotation of the planet carrier, an annular gear rotatable about the axes of the driving and driven shafts and meshing with the first planet, and means engageable to prevent rotation of the annular gear.

Thus when the planet carrier is held stationary and the second clutch is engaged, power is transmitted from the first sun to the second (and the driven shaft) via the planets, whose axis is restrained from movement; when the second intermediate shaft is held stationary and the first clutch is engaged, power is transmitted from the planet carrier to the second sun via the second planet, the first sun taking the torque reaction; and when both the second intermediate shaft and the planet carrier are free to rotate and both clutches are engaged none of the suns and planets rotate relative to each other and there is a direct drive from driving to driven shaft. If the means engageable to prevent rotation of the annular gear and the second clutch are engaged the first clutch disengaged and planet carrier unrestrained, a fourth gear ratio is provided.

If the driving shaft always rotates in the same direction (being driven, for example, by a conventional internal combustion engine) and the first sun is smaller than the second (as will usually be the case, in for example, a transmission for a motor vehicle) the means engageable to prevent rotation of the planet carrier preferably comprise a free-wheel mechanism which when the first clutch is engaged over-runs and when only the second clutch is engaged takes up the torque reaction on the planet carrier.

Preferably means are provided to couple the annulus to the driven shaft, when a higher ratio than direct drive (i.e. a fourth or fifth ratio as the case may be) is provided if the annulus is coupled to the driven shaft, the first clutch is engaged, the second intermediate shaft restrained, and the second sun uncoupled from the driven shaft. Also, if the planet carrier is restrained by, if a free wheel is used, locking it or engaging a dog clutch across it, the annulus is coupled to the driven shaft and the second clutch engaged, a reverse gear is obtained.

The second sun is conveniently mounted upon a third intermediate shaft, collinear with the driving and driven shafts, and a two position clutch is also provided by means of which the driven shaft may be coupled either to the third intermediate shaft or to the annular gear.

The means engageable to prevent rotation of the second intermediate shaft, and the annular gear, and the first and second clutches are preferably all capable of slipping, so that changes of ratio without cessation of power transmission may be effected so long as these changes do not involve coupling or uncoupling the annular gear and output shaft.

A transmission system in accordance with the invention will now be described with reference to the accompanying drawing which shows the transmission in section.

In the figure various bearings, bolts etc. are shown whose function is obvious and whose precise nature is not important for an understanding of the invention. These will not be further referred to.

The colinear driving and driven shafts are indicated at 1 and 2 respectively. A relatively fixed housing is indicated at 3.

A member 4 attached to shaft 1 constitutes a driving member of first and second clutches, indicated generally at 23 and 24, whose driven members are indicated at 5 and 6 respectively. Clutches 23 and 24 are of the magnetic particle type (as described for example in British specification No. 649,553), the electric current for their energising windings, indicated at 25 and 26, being supplied through slip-rings 27. Member 5 is attached to a solid first intermediate shaft 7 which is colinear with shafts 1 and 2 and extends concentrically through a hollow second intermediate shaft 8, to one end of which is attached member 6 and to whose other end is attached a first sun wheel 9. A brake member 10 is attached to shaft 8 and may be frictionally locked to housing 3 by conventional band brakes 28. A second sun wheel 11 is attached to one end of a third intermediate shaft 21, being larger in diameter than the sun wheel 9. Shaft 21 is colinear with shafts 1 and 2. A planet carrier 12 is attached to the end of shaft 7 protruding beyond sun wheel 9 and has journalled in it similar short shafts 13, each of which carries a first planet pinion 14 meshing with sun wheel 9 and a second planet pinion 15 meshing with sun wheel 11. A free-wheel mechanism 20 is disposed between planet carrier 12 and housing 3, and is such that it over-runs when shaft 1 rotates in its normal direction and clutch 23 is engaged. The planet carrier 12 may be locked in relation to housing 3, thus effectively locking free-wheel 20, by means of a plunger 29, which may engage with a toothed ring 30 formed on carrier 12. An annular gear 16 is concentric and coplanar with sun 9 and meshes with planet pinions 14. It is carried by a hollow shaft 17 surrounding third intermediate shaft 21. Shaft 17 carries a brake member 19, in the form of a cylinder surrounding gear 16. Member 19 may be frictionally locked to housing 3 by conventional brake bands 31. Driven shaft 2 may be connected either to third intermediate shaft 21 or to hollow shaft 17 by means of a two-position dog clutch 18. Clutch 18 has a slideable sleeve 32 formed with two sets of internal teeth 33 and 34, separated by a gap 35. Teeth 34 are in permanent engagement with splines 36 formed on shaft 2 and in one position of sleeve 32 (that shown in the figure) also engage with teeth 37 formed on the end of shaft 21. In the other position of sleeve 32, teeth 34 disengage teeth 37 and teeth 33 engage teeth 38 formed at the end of hollow shaft 17, sleeve 32 then being positioned to the right relative to the position shown in the figure. Sleeve 32 is formed with an annular external channel 39 which is engaged by one end of a pivoted spring loaded bell crank lever 40, whose other end is engaged by the plunger 41 of a solenoid 42. Thus when the solenoid is de-energised sleeve 32 has the position shown in the figure and when the solenoid is energised it moves to the right, so engaging teeth 33 and 38.

The various ratios provided by the transmission are controlled by controlling the energisation of clutches 25 and 26, the brake bands 28 and 31, the positioning of plunger 29 and the energisation of solenoid 42. These controls may be exercised by any convenient means, either manual or automatic, to give the transmission ratio appropriate to any particular conditions of road and engine speed, engine throttle position, engine manifold depression etc.

Convenient tooth numbers for the various wheels, all having the same pitch, are as follows:

| | Teeth |
|---|---|
| Sun 9 | 24 |
| Planet 14 | 39 |
| Annular gear 16 | 102 |
| Sun 11 | 42 |
| Planet 15 | 21 |

The ratios provided (i.e. ratio of speed of shaft 1 to speed of shaft 2) can then be seen to be as follows:

| | Ratio (to one) | Clutch and brake members | | | | | |
|---|---|---|---|---|---|---|---|
| | | 23 | 24 | 10 | 18 | 19 | 20 | 29 |
| First | 3.25 | D | E | D | 21 | D | Locks under reverse torque. | D |
| Second | 2.28 | D | E | D | 21 | E | Over-runs | D |
| Third | 1.45 | E | D | E | 21 | D | ...do | D |
| Direct | 1.00 | E | E | D | 21 | D | ...do | D |
| Overdrive | .81 | E | D | E | 17 | D | ...do | D |
| Reverse | 4.25 | D | E | D | 17 | D | Locked | E | where "E" and "D" indicates respectively that the clutch or brake in question is engaged or disengaged, and so far as dog clutch 18 is concerned, the numerals "21" or "17" indicate whether shaft 2 is clutched to shaft 21 or 17.

It is also desirable to consider the torque sustained by each clutch or brake member when it is engaged. The various torques can be seen to be as follows, assuming 100% efficiency and taking the torque applied to shaft 1 as unity:

| | 5 | 6 | 10 | 18 | 19 | 20 |
|---|---|---|---|---|---|---|
| First | | +1.0 | | | | −2.25 |
| Second | | +1.0 | | | −1.28 | |
| Third | +1.0 | | | −0.45 | | |
| Direct | +.692 | +.308 | | | | |
| Overdrive | +1 | | | +0.19 | | |

I claim:

1. An epicyclic transmission for the transmission of power from a driving shaft to a driven shaft collinear therewith having first and second intermediate shafts and first and second clutches whose driving members are connected to the driving shaft and whose driven members are attached respectively to said first and second intermediate shafts concentric with each other and the driving shaft, means engageable to prevent rotation of the second intermediate shaft, a first sun wheel mounted on the second intermediate shaft, a second sun wheel, of diameter different from the first sun wheel, coupled to the driven shaft, a planet carrier mounted on the first intermediate shaft, first and second planet pinions mounted in the planet carrier upon a common shaft for rotation about an axis parallel to that of the input shaft, said first and second planet pinions engaging with the first and second sun wheels, means engageable to prevent rotation of the planet carrier, an annular gear rotatable about the axes of the driving and driven shafts and meshing with the first planet and engageable means to prevent rotation of the annular gear.

2. An epicyclic transmission for the transmission of power from a driving shaft to a driven shaft collinear therewith having first and second intermediate shafts and first and second clutches whose driving members are connected to the driving shaft and whose driven members are attached respectively to said first and second intermediate shafts concentric with each other and the driving shaft, means engageable to prevent rotation of the second intermediate shaft, a first sun wheel mounted on the second intermediate shaft, a second sun wheel, of diameter greater than the first sun wheel, coupled to the driven shaft, a planet carrier mounted on the first intermediate shaft, first and second planet pinions mounted in the planet carrier upon a common shaft for rotation about an axis parallel to that of the input shaft, said first and second planet pinions engaging with the first and second sun wheels, means engageable to prevent rotation of the planet carrier comprising a free-wheel mechanism which when the first clutch is engaged over-runs and when only the second clutch is engaged takes up the torque reaction on the planet carrier, an annular gear rotatable about the axes of the driving and driven shafts and meshing with the first planet and engageable means to prevent rotation of the annular gear.

3. A transmission system as claimed in claim 2, having also means to couple the annular gear to the driven shaft and uncouple the second sun wheel from the driven shaft.

4. A transmission system as claimed in claim 3, wherein the means to couple the annular gear to the driven shaft and uncouple the second sun wheel from the driven shaft comprise a two-position dog clutch.

5. A transmission system as claimed in claim 2, wherein the means engageable to prevent rotation of the annular gear, and the first and second clutches are capable of slipping.

6. A transmission system as claimed in claim 1, wherein the first and second clutches are of the magnetic particle type.

7. A transmission system as claimed in claim 5, wherein the first and second clutches are of the magnetic particle type.

References Cited in the file of this patent

UNITED STATES PATENTS

| 2,150,950 | Thoma | Mar. 21, 1939 |
| 2,530,200 | Hobbs | Nov. 14, 1950 |
| 2,608,885 | Lapsley | Sept. 2, 1952 |
| 2,718,797 | Gravina | Sept. 27, 1955 |

FOREIGN PATENTS

| 493,545 | Italy | Apr. 27, 1954 |
| 650,873 | Great Britain | Mar. 7, 1951 |
| 1,042,623 | France | Nov. 3, 1952 |